United States Patent [19]

Douchet et al.

[11] Patent Number: 5,472,754
[45] Date of Patent: Dec. 5, 1995

[54] MULTILAYER PLASTICS MATERIAL HOSE

[75] Inventors: Jean-Claude Douchet, Plessis Brion; Patrick Desbois, Roye, both of France

[73] Assignee: Nobel Plastiques, Nanterre, France

[21] Appl. No.: 307,697

[22] PCT Filed: Feb. 2, 1994

[86] PCT No.: PCT/FR94/00126

§ 371 Date: Sep. 23, 1994

§ 102(e) Date: Sep. 23, 1994

[87] PCT Pub. No.: WO94/18485

PCT Pub. Date: Aug. 18, 1994

[30] Foreign Application Priority Data

Feb. 5, 1993 [FR] France .................. 93 01299
Jun. 29, 1993 [FR] France .................. 93 07903

[51] Int. Cl.$^6$ .............. B32B 1/08; F16L 11/12
[52] U.S. Cl. ................ 428/36.91; 428/475.8; 428/476.3; 428/515; 428/523; 428/922; 138/141

[58] Field of Search .............. 138/141; 428/36.91, 428/214, 475.8, 476.3, 515, 523, 922

[56] References Cited

U.S. PATENT DOCUMENTS

| 4,196,464 | 1/1980 | Russell | 361/215 |
| 4,973,625 | 11/1990 | Deyrup | 525/74 |

FOREIGN PATENT DOCUMENTS

| 0428834 | 5/1991 | European Pat. Off. . |
| 3821723 | 9/1989 | Germany . |
| 436692 | 5/1967 | Switzerland . |

Primary Examiner—Charles R. Nold
Attorney, Agent, or Firm—Sixbey, Friedman, Leedom & Ferguson; Gerald J. Ferguson, Jr.; Donald R. Studebaker

[57] ABSTRACT

A multilayer synthetic material tube manufactured by co-extrusion and adapted to convey motor vehicle fuel, from the inside towards the outside, a layer of high-density polyethylene, a layer of polyethylene, comprising acrylic acid and/or maleic anhydride copolymer adhesive, and an outer layer of polyamide.

4 Claims, No Drawings

MULTILAYER PLASTICS MATERIAL HOSE

The present invention concerns a plastics material hose for fluids used in motor vehicles, such as the fuel or the windshield washer liquid, the engine coolant liquid or even the liquid used in the heating/air conditioning system.

Non-metal hoses as used at present are mainly made from polyamide. This material has a number of drawbacks, due in particular to the inevitable presence of alcohol in the fluids the hoses convey. A first effect of the alcohol is to cause the material to swell, which destroys its dimensional characteristics and causes leaks or unacceptable stresses in the hoses. The alcohol also dissolves some constituents of the hose and these are entrained into and foul the remainder of the system.

One proposal to overcome these drawbacks is to line the hoses with a thin co-extruded barrier layer, for example a layer of a polyolefin (especially polypropylene)

Other proposals line the hose with an ethylene vinyl alcohol copolymer (EVOH) because these materials are known to provide an effective barrier against organic solvents in particular. However, EVOHs tend to retain alcohol, especially methanol.

Products have also been described in which this layer is sandwiched between a thick polyamide outer layer and a thin polyamide inner layer.

Work has been done on the use of polyethylene in fuels tanks, this neutral material having high resistance to alcohol. To improve vapor sealing, the inside of the preform has a thin layer of silica or fluorine deposited on it. This technique seems to be satisfactory but is still costly if applied to hoses, which have to have other characteristics such as mechanical strength and resistance to grit thrown up from the road.

The present invention proposes an alternative hose material which is suitable for conveying liquids containing alcohol. This liquid can be fuel containing additional alcohol to lower its flash point as a substitute for lead, the use of which is now prohibited. The liquid can also be the windshield washer liquid or even the coolant liquid, which can contain up to 50% glycol.

To this end the invention consists in a multilayer synthetic material tube manufactured by co-extrusion and adapted to convey motor vehicle fuel, which tube comprises, from the inside towards the outside, a layer of high-density polyethylene, a layer of polyethylene, acrylic acid and/or maleic anhydride copolymer adhesive, and an outer layer of polyamide.

The use of high-density polyethylene is advantageous because it provides an excellent barrier to alcohol at low cost. It is an inert material with a much higher degree of crystallization than low-density polyethylene and therefore has an inherently more compact structure that is more difficult for alcohol and hydrocarbon molecules to penetrate. High-density polyethylene also has the advantage of being easy to weld, either to form partitions inside the hose or to join it to a connection device fitted to the end of the hose. The thickness of the inner layer is advantageously in the order of 0.5 mm to 0.8 mm to enable welding to internal partitions or to a connection device at the end of the hose.

The high-density polyethylene (HDPE) is attached to the polyamide (PA 11 or 12) outer layer with polyethylene, acrylic acid and/or maleic anhydride copolymer co-extruded with the inner layer and having a thickness in the order of 0.2 mm.

Finally, the polyamide outer layer is used primarily to constitute a barrier to hydrocarbons and for mechanical strength and resistance to abrasion and to impact of grit thrown up from the road.

The hose has three co-extruded layers:

a high-density polyethylene layer 0.5 mm to 0.8 mm thick, a polyethylene, acrylic acid and/or maleic anhydride copolymer adhesive layer approximately 0.2 mm thick, a polyamide layer 0.3 mm to 0.5 mm thick, which is much thinner than single-layer polyamide hoses, which have a much thicker outer layer (about 1 mm thick).

This product has a lower cost than the products used at present and has excellent strength and impermeability characteristics. Providing the fuel barrier by means of two materials enables the use of materials with a lower total cost than a single material that provides a barrier both to alcohols and to hydrocarbons.

The choice of polyethylene for the inner layer is beneficial because it can be filled with a powder material such as graphite. The inner layer can thus be conductive to protect the hose against static electricity.

In a second embodiment of the invention the inner layer is of cross-linked high-density polyethylene. The hose is therefore made up of three co-extruded layers, of which the inner layer is polyethylene cross-linkable in the above thicknesses, after which the whole (or at least the inner wall) is treated with water or steam to cross-link the polyethylene. This improves the temperature resistance of the hose and its impermeability to alcohol and hydrocarbons. A particularly advantageous application of such hoses is in the cooling water circuit of the vehicle engine, where the temperature is about 100° C. to 150° C. Furthermore, the cross-linking can be done with the hose held in shape. The end product then remains in substantially this shape.

The invention claimed is:

1. A multilayer synthetic material tube manufactured by co-extrusion for carrying motor vehicle fuel, comprising from the inside towards the outside, a first layer of high-density polyethylene, a second layer of polyethylene including a maleic anhydride copolymer adhesive, and a third layer of polyamide.

2. A tube according to claim 1, wherein the high-density polyethylene is cross-linked.

3. A tube according to claim 1 or claim 2, wherein the layer thicknesses are:

high-density polyethylene layer: 0.5 mm to 0.8 mm, adhesive layer: 0.2 mm, polyamide layer: 0.3 mm to 0.5 mm.

4. A tube according to claim 1, wherein the inner layer is of polyethylene filled with an electrically conductive powder material to form an antistatic layer.

* * * * *